(12) United States Patent
Ascari

(10) Patent No.: US 6,740,347 B2
(45) Date of Patent: May 25, 2004

(54) AUTOMATIC PEAR PROCESSING MACHINE

(75) Inventor: Carlo Ascari, Cavezzo (IT)

(73) Assignee: ABL S.r.l., Cavezzo (IT)

( * ) Notice: Subject to any disclaimer, the term of this patent is extended or adjusted under 35 U.S.C. 154(b) by 0 days.

(21) Appl. No.: 10/333,061

(22) PCT Filed: Jul. 30, 2001

(86) PCT No.: PCT/IT01/00415
§ 371 (c)(1),
(2), (4) Date: Jan. 16, 2003

(87) PCT Pub. No.: WO02/09538
PCT Pub. Date: Feb. 7, 2002

(65) Prior Publication Data
US 2004/0025716 A1 Feb. 12, 2004

(30) Foreign Application Priority Data
Jul. 31, 2000 (IT) .................................. MO2000A0167

(51) Int. Cl.[7] .......................... A23N 4/00; A23N 4/14; A23N 4/22; A23N 7/00; A23N 15/00
(52) U.S. Cl. .......................... 426/231; 99/489; 99/490; 99/491; 99/543; 99/547; 99/482; 99/484
(58) Field of Search .......................... 99/486, 489–491, 99/537–543, 547–566; 426/231–233, 480–482, 483–485

(56) References Cited
U.S. PATENT DOCUMENTS

| | | | | |
|---|---|---|---|---|
| 2,056,413 A | * | 10/1936 | Thompson | 99/543 |
| 3,055,408 A | * | 9/1962 | Harrer | 99/543 |
| 3,058,502 A | | 10/1962 | Loveland et al. | |
| 3,680,614 A | * | 8/1972 | Polk, Jr. | 99/589 |
| 4,112,838 A | * | 9/1978 | Altman et al. | 99/546 |
| 4,150,611 A | * | 4/1979 | Bellini | 99/548 |
| 4,184,423 A | * | 1/1980 | Raque et al. | 99/537 |
| 4,629,620 A | * | 12/1986 | Lindahl et al. | 424/473 |
| 4,766,990 A | * | 8/1988 | Colombo | 198/383 |
| 5,027,669 A | * | 7/1991 | Nakano | 476/41 |
| 5,250,311 A | * | 10/1993 | Ross et al. | 426/231 |
| 5,431,095 A | * | 7/1995 | Paterson et al. | 99/636 |
| 5,435,238 A | | 7/1995 | Paterson et al. | |
| 6,125,742 A | * | 10/2000 | Polaco et al. | 99/564 |
| 6,205,900 B1 | * | 3/2001 | Heck et al. | 83/551 |

* cited by examiner

Primary Examiner—Timothy F. Simone
(74) Attorney, Agent, or Firm—Young & Thompson

(57) ABSTRACT

Automatic pear processing machine, performing the operations of singularizing the pears, picking them up from a container (2), peeling and coring them, and separating the edible parts, wherein the improvement consists, besides other things, in providing elements (14, 25, 26, 27, 20) allowing to immediately reject pears of irregular form, which would necessarily lead to waste material, and moreover, in providing holes (46, 53) of very small diameters, on the blades (44, 45) used for cutting the pears into segments. The holes (46, 43) of very small diameter, or "microholes", allow to inject a fluid, so as to ensure the detachment of the core from both halves of the pears, and the detachment of these parts from the blades (44, 45).

16 Claims, 17 Drawing Sheets

FIG. 8-bis

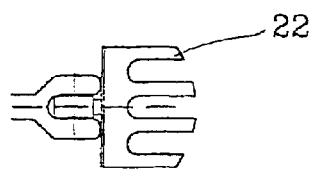
FIG. 9
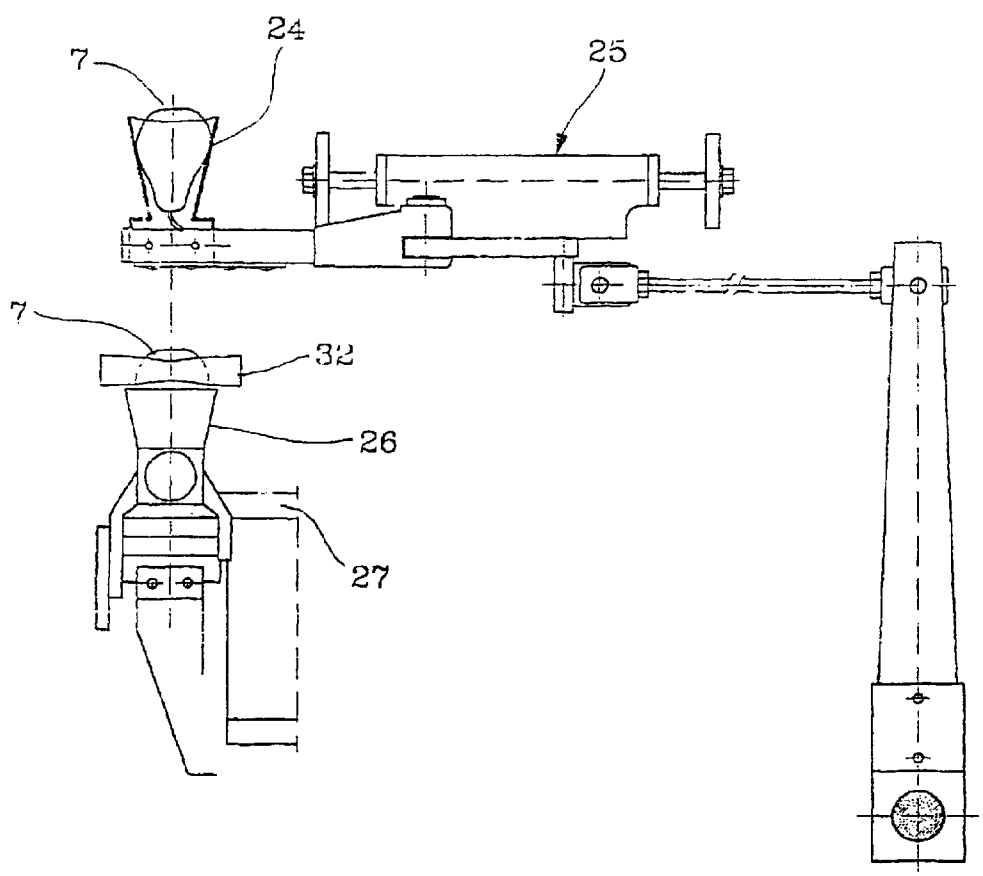
FIG. 11
FIG. 10

FIG. 12-bis

AUTOMATIC PEAR PROCESSING MACHINE

TECHNICAL FIELD

The present invention relates to an automatic industrial machine suited to process pears, so that the latter may be conserved and/or utilised in order to prepare fruit-salads or other confectionery products, ice-creams, or other foods.

BACKGROUND ART

The Italian patent No. 1296742, corresponding to the application PCT/IT98/00286 which was filed on Oct. 16, 1998, (both to the same applicant A.B.L. s.r.l.), teaches that during automatic processing of pears, the latter must first be fed and oriented, and later on peeled, cored, and cut into segments.

It is well known that the pears, in order to be processed automatically, must be divided up into groups ("calibration") with dimensions lying between a minimum and a maximum value. Moreover, it is known that notwithstanding this subdivision, any lot of pears to be processed inevitably includes a percentage of pears which, due to:

incorrect orientation, shape irregularity, different degree of ripening, other unforeseeable effects, is spoilt and therefore irremediably discarded, thereby obtaining at the end of the process, a percentage of edible product which depends on the variable percentage of product which becomes unusable. Furthermore, it is known that in the final step of the processing cycle, consisting in the removal ("seed celling") of the central core from the edible segments, a further product waste is generated, due to the difficulty in ensuring this removal; moreover, it is known that a further waste percentage is caused by an irregular and non uniform peeling.

A main object—but not the only object—of the present invention, is to separate from the other pears, by recovering them, all pears which do not correspond to a predefined size, which are irregular in shape, or which are not correctly oriented.

Another object of the present invention is to ensure the detachment that is the separation, of the core from the edible parts.

A further object is to ensure a concentric coring with respect to the woody and cartilaginous part of the pear, and a regular and uniform peeling as well.

Still a further object of the present invention is to allow also the processing of pears which are somewhat ripe and delicate, without spoiling them.

DISCLOSURE OF INVENTION

These and further objects are attained with a machine according to the present invention, comprising several processing stations, wherein in each of these stations there is performed a processing step following the preceding one, said steps including feeding, orientation, peeling, and final cutting into segments; the machine being characterised in that it comprises: a device suited to "read" the orientation and deformity of the pear, in order to stop the pear or, otherwise, allow continuation of its processing; a device which discharges pears which cannot be processed, onto a conveyor belt or into a hopper, so as to allow their recovery; a positioning device, for accurately positioning the pears before peeling; a pear feeder, which ensures the presence of a single, horizontally arranged pear, in a precise reference position; a rotary pneumatic distributor, suited to feed compressed air to air cylinders used to actuate a plurality of pear centering pliers; a device for coring and cutting the pear into segments, provided with holes of very small diameter, which allow to safely separate the core from the edible parts after the cutting operation has been performed; a cam, which imparts to a peeling mill a movement corresponding to the pear contour; a knockout device of the "carrot", which comprises the flower and stem of the pear, said device being actuated by compressed air during the expulsion, and giving rise to a negative pressure for the return to the starting position.

BRIEF DESCRIPTION OF DRAWINGS

Further features and advantages of the invention will be clarified by describing a preferred, non exclusive embodiment, of the device illustrated for exemplificative and non-limitative purposes, in the annexed drawings, in which:

FIG. 6 schematically shows the device used to:

Figure 5:
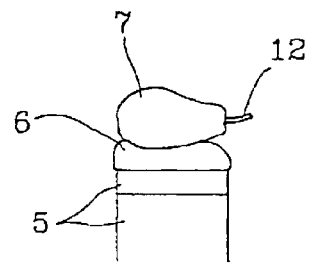
FIG. 5 is a detailed view, corresponding to the direction of observation indicated by the arrow F1 in FIG. 4, of the support which sustains and positions the pear in a precise and predetermined position, so that the pear can continue with its processing cycle.
Figure 4:
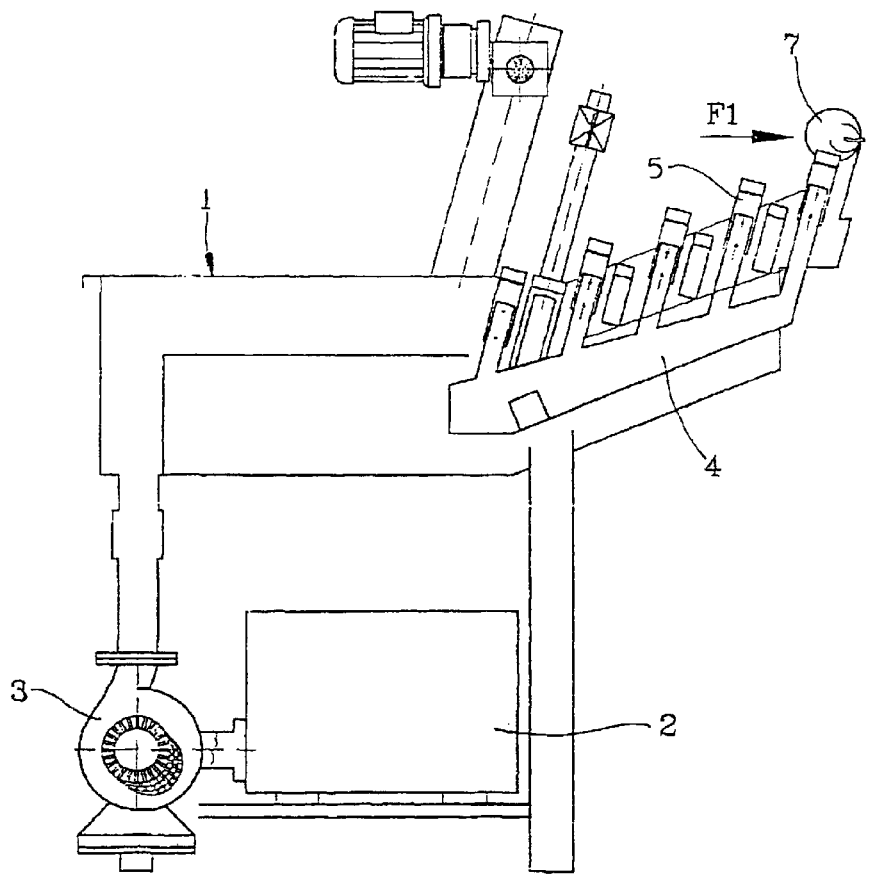
FIG. 4 schematically shows the device, used to wash and feed, on four rows at the same time, a single pear for each row, the said pear being horizontally positioned, with its stem pointing to the right or left of an observer.
Figure 6:
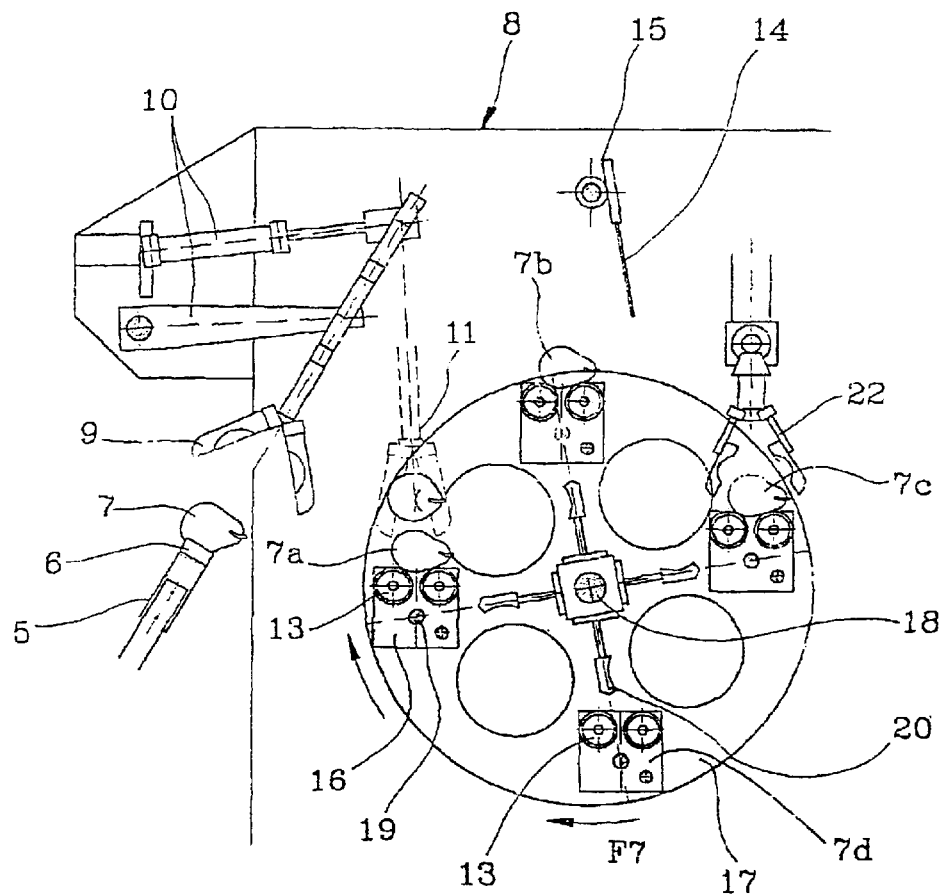
Figures 7, 8:
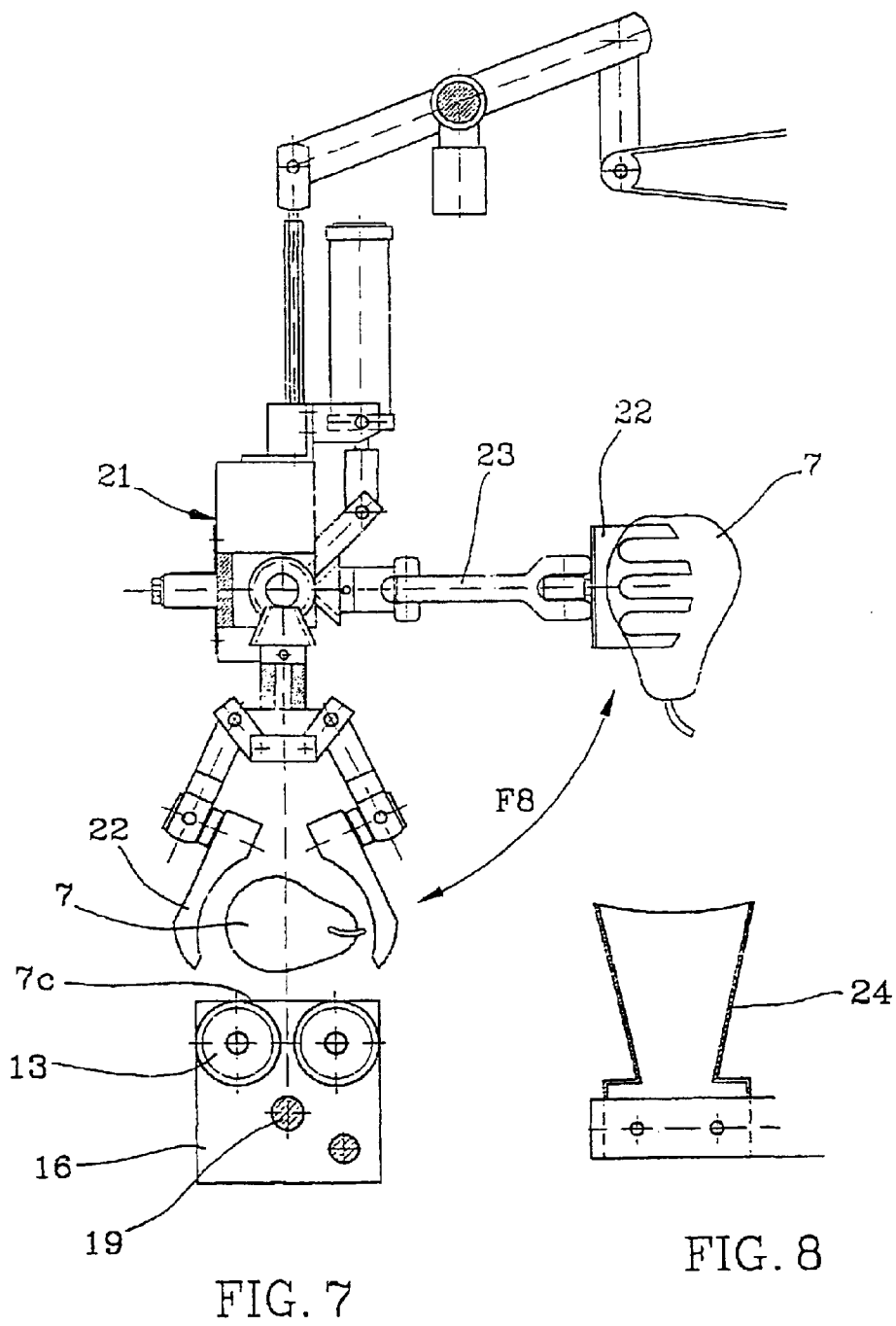
Figure 12:
Figure 12:
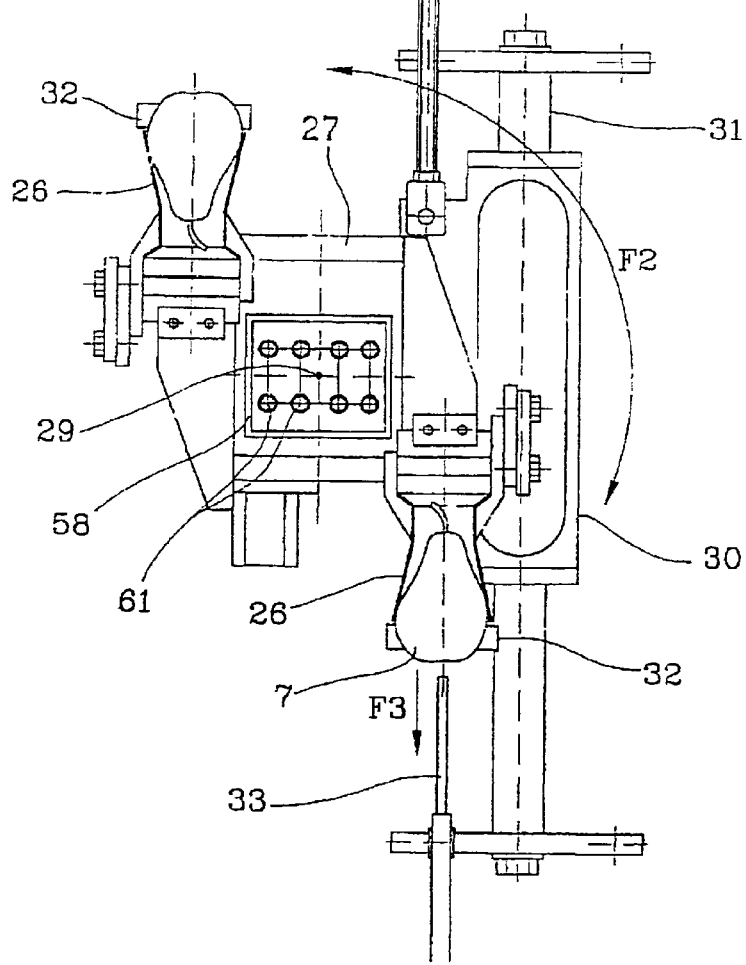

a) take out the pear from the device shown in FIGS. 4–5;
b) determine the pear orientation (stem pointing to the right or to the left);
c) determine whether the shape of a particular pear allows its further processing or whether it must be discarded and separately recovered;
d) determine if the pear is allowed to continue the processing cycle, or if it must be removed from the processing cycle and recovered elsewhere;

FIG. 7 schematically shows the device which takes off, from the device of FIG. 6, the pears allowed to continue with the processing cycle, and which, regardless of the former position of the stem, positions the pear with its axis arranged vertically and its stem always pointing downwards, and which finally drops the pear to let it fall inside a funnel-shaped support;

FIG. 8 shows the funnel-shaped support inside which the pear is dropped;

FIG. 9 shows the pliers of the device of FIG. 7, used to position the pear with their axis directed vertically;

FIG. 10 schematically shows the device which receives the pears and transfers them onto another device, shown in FIGS. 11 and 12;

FIG. 11 shows that portion of the device of FIG. 12, receiving the pears from the device of FIG. 10;

FIG. 8-bis (drawing sheet No. 7) illustrates the funnel-shaped part of the device of FIG. 10;

FIG. 12 schematically shows the device receiving the pears from the device of FIG. 10. The device of FIG. 12:

a) receives the pear in a "funnel", or funnel-shaped support, and maintains its axis vertically and its stem oriented downwards;
b) centres the pear and holds it by means of adequate self-centering pliers;
c) performs a rotation of 180° (arrow F2), after which the pear is always oriented with a vertical axis and its stem pointing upwards;
d) moves downwards in the direction of the arrow F3, in order to thrust the pear into a tubular tool.

Figure 13:
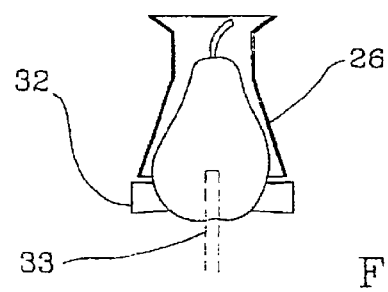
Figure 13:
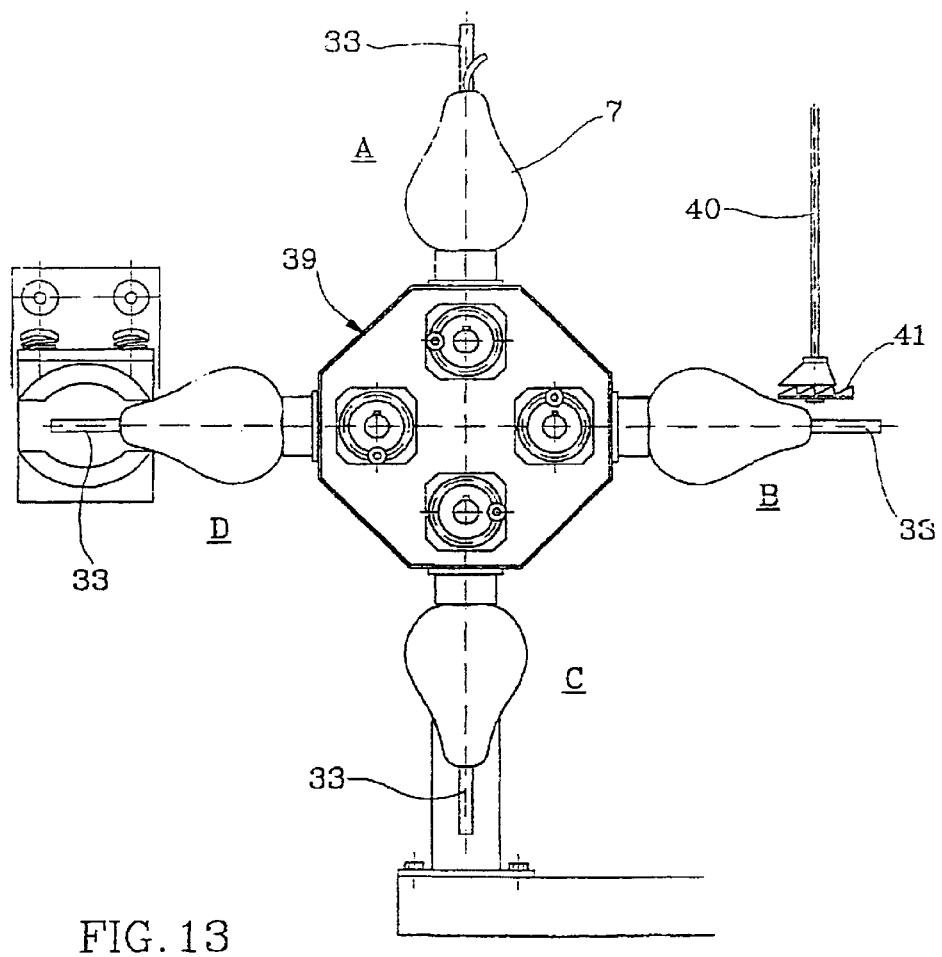
Figure 14:
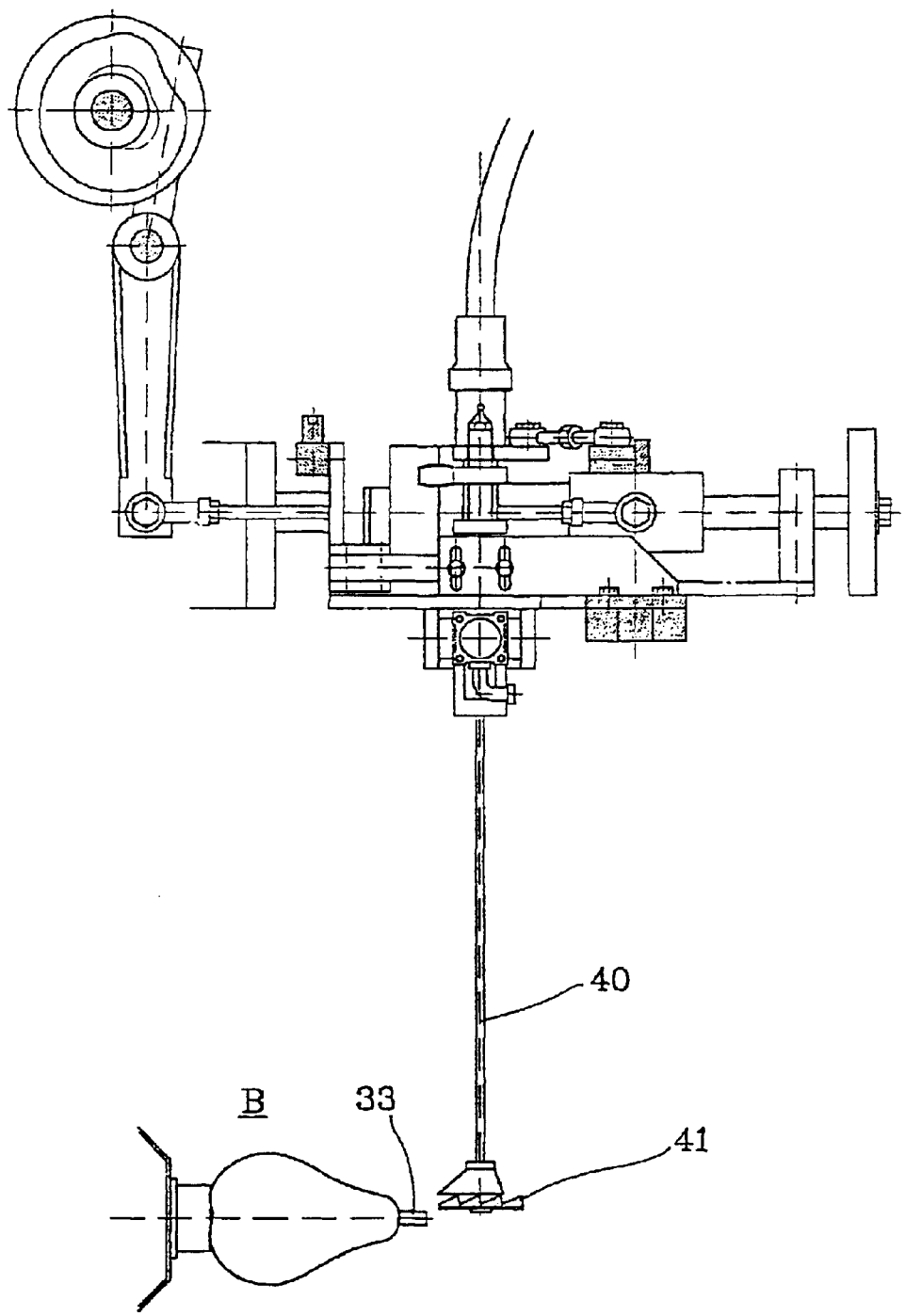
Figure 15:
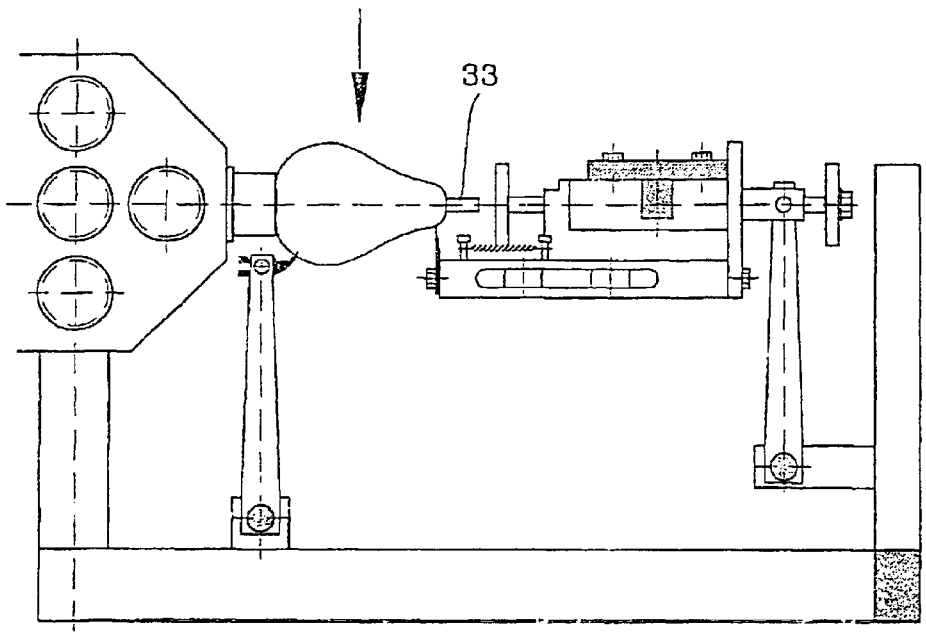
Figure 16:
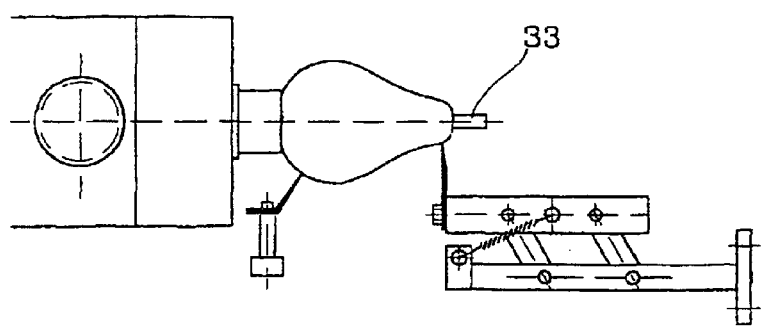

FIG. 12-bis (drawing sheet No. 8) shows the pliers of the device of FIG. 12, after the pear has been thrust onto the tubular tool;

FIG. 13 schematically shows a rotatable table, including four stations (A, B, C, D), on which the pear is processed in every station; however, in station A the pear is only thrust on the tubular tool;

FIG. 14 schematically shows the device used to peel the pear in station B, using a suitable motorised mill;

FIGS. 15 and 16 schematically show, according to two orthogonal views, a device completing the peeling in the blossom end and removing the end of the pear on the stem side.

Figure 1:
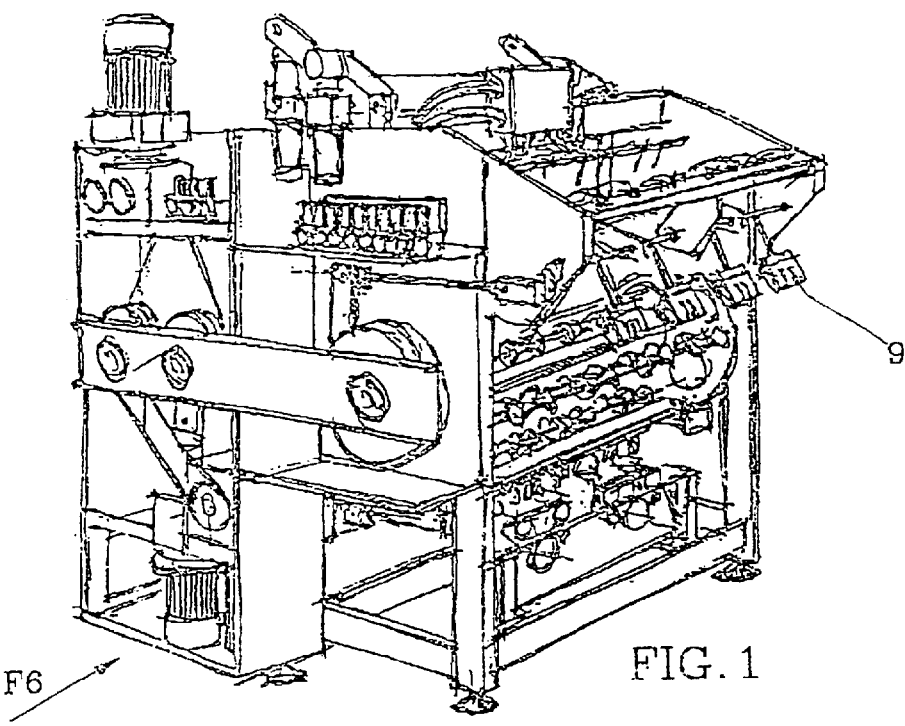
FIGS. 1 and 2 are general views shorting the machine without the feeder, according to two different angles of observation, said machine being suited to work simultaneously along four parallel paths or rows, so as to process four pears at the same time.
Figure 2:
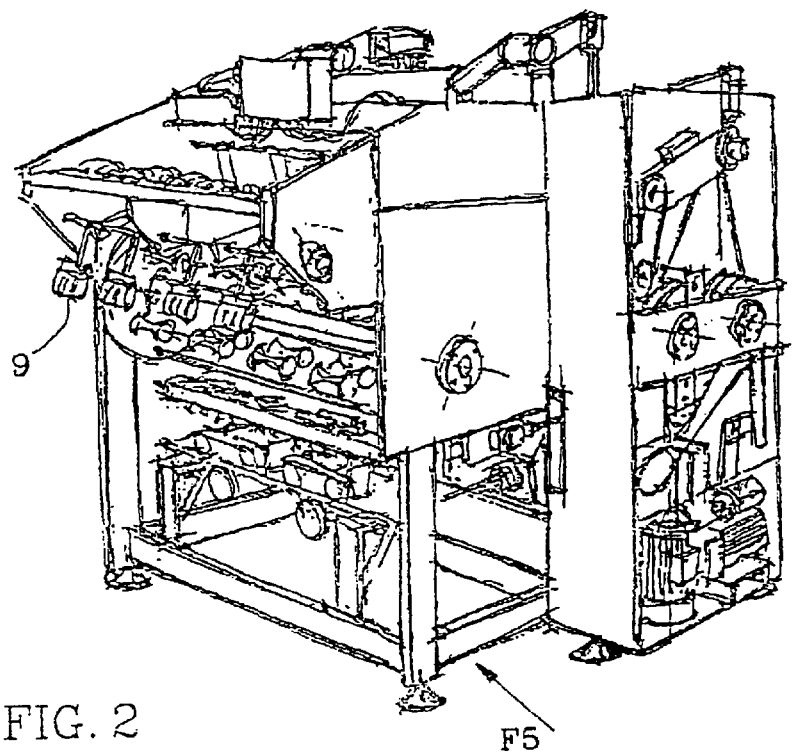
Figure 17:
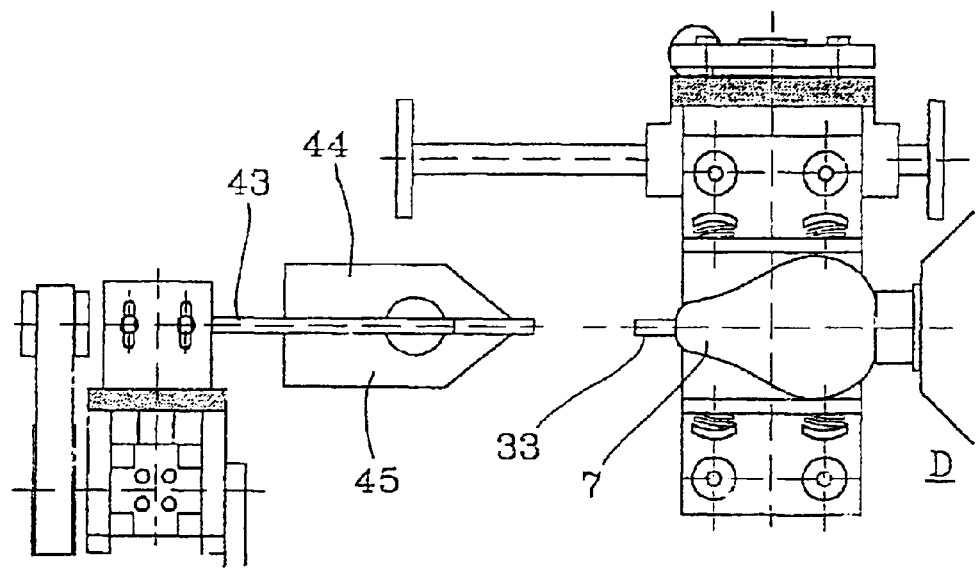
Figure 18:
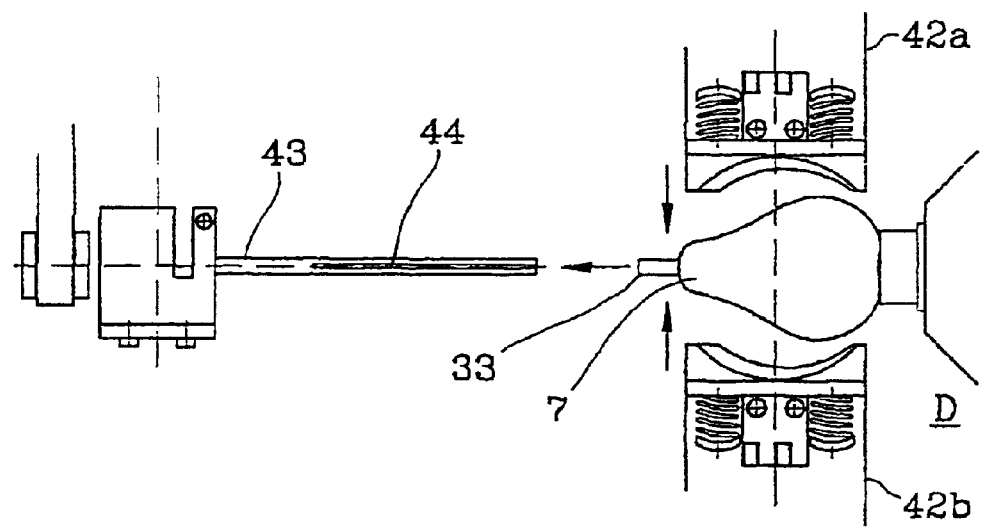
Figure 19:
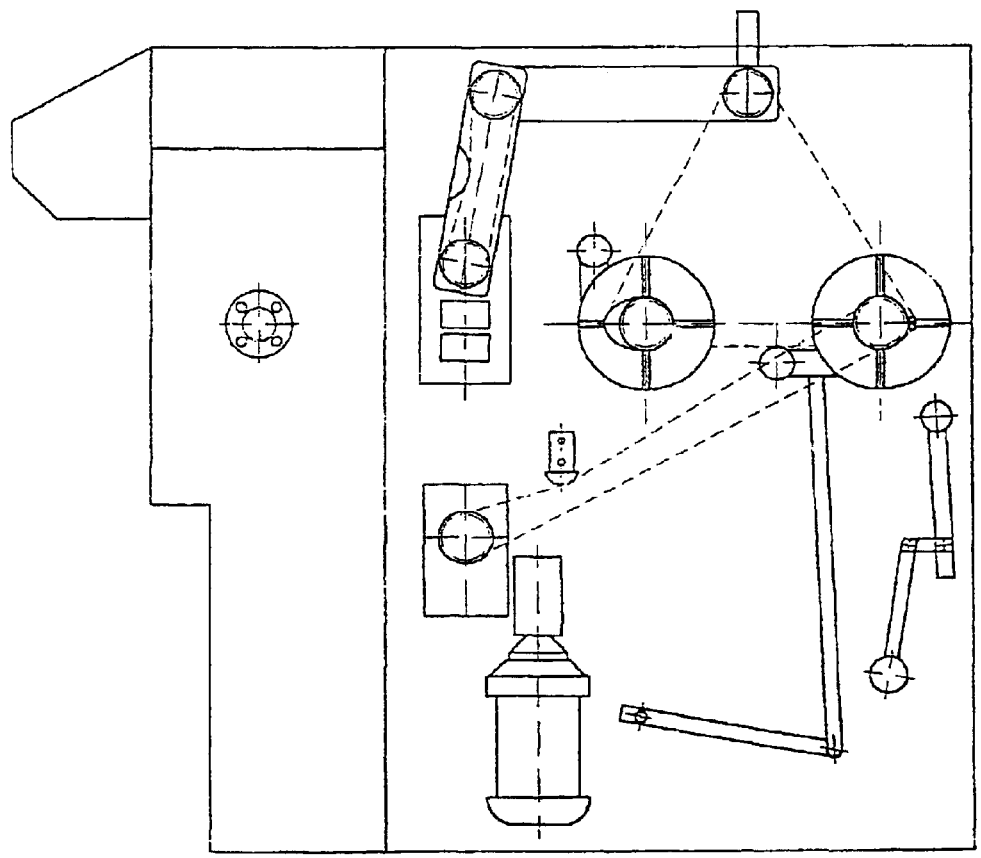
Figure 20:
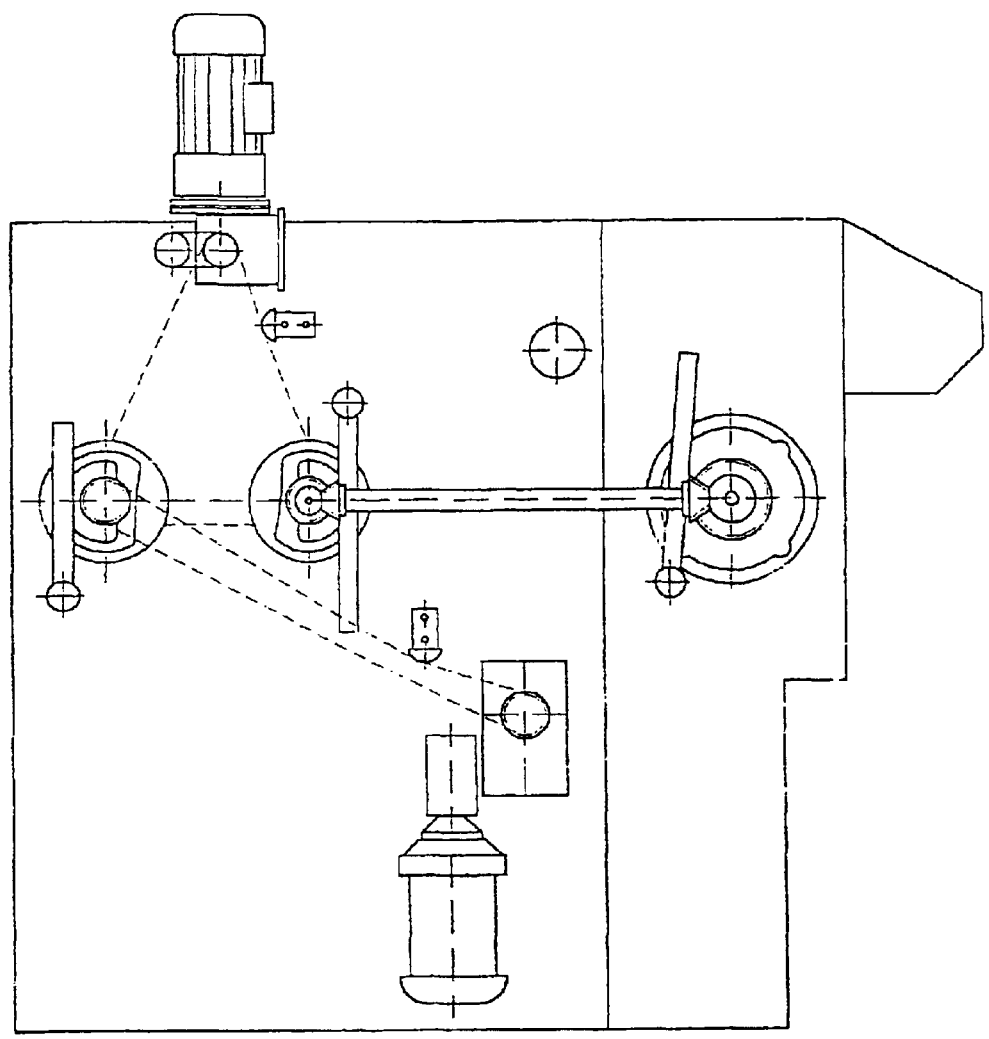
Figure 21:
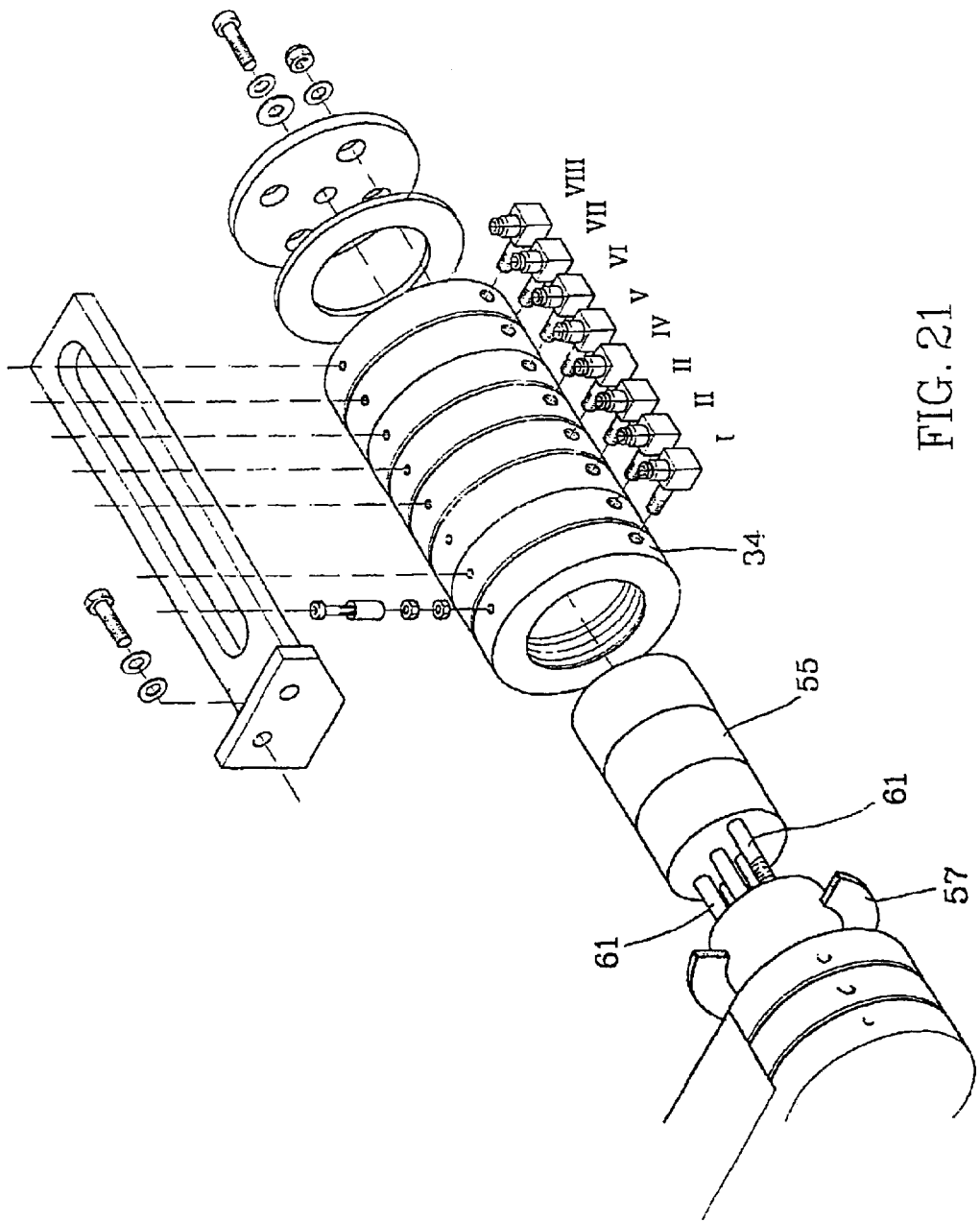
Figure 22:
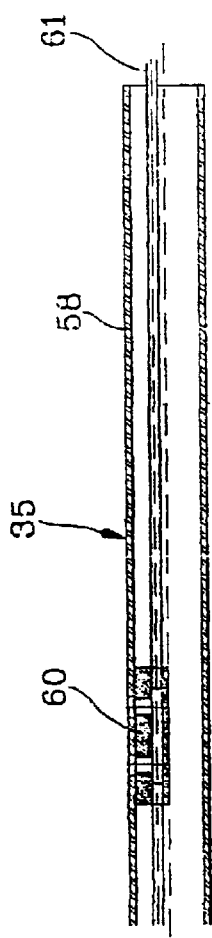
Figure 23:
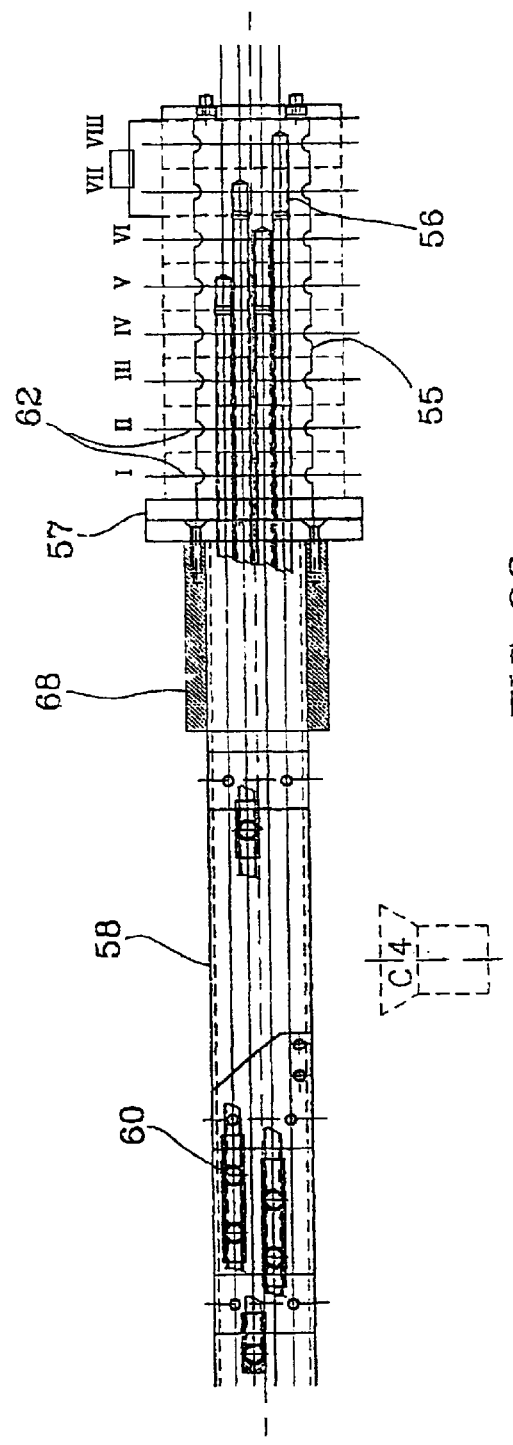
Figure 24:
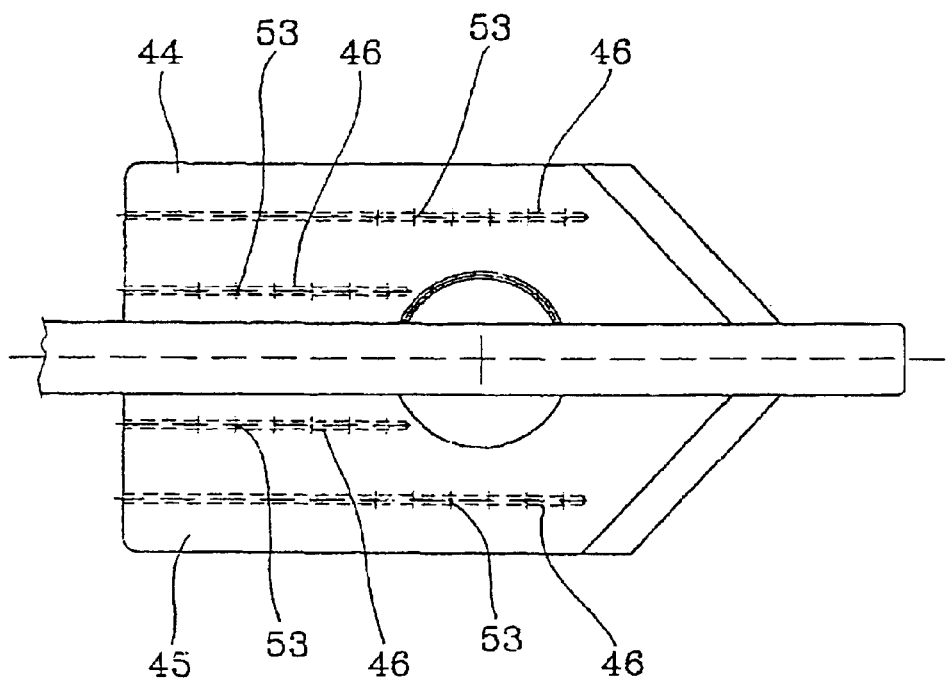
Figure 25:
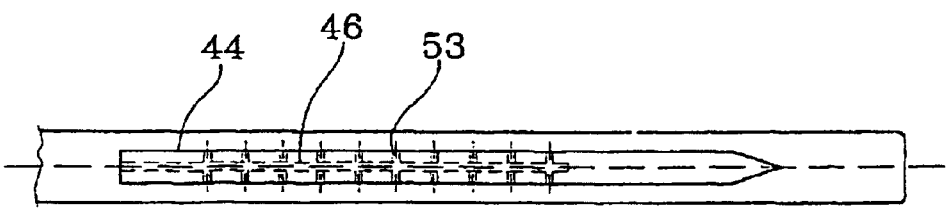
Figure 26:
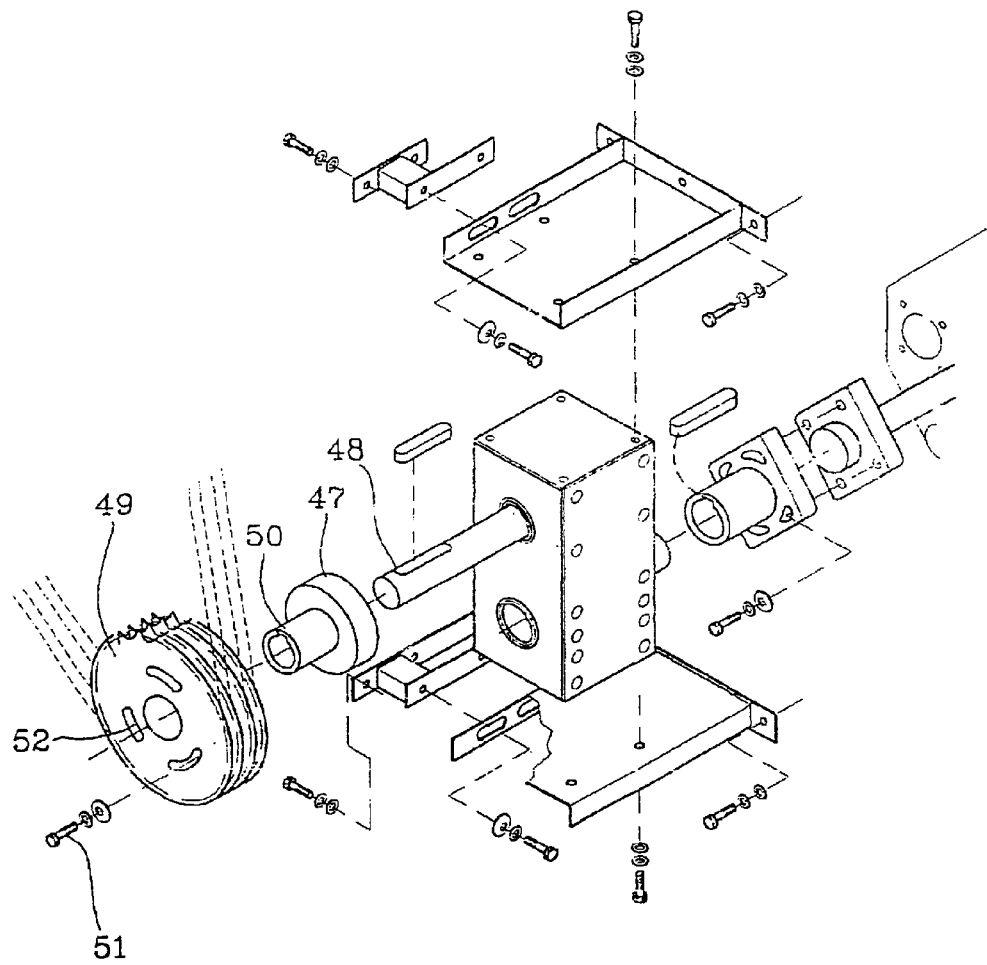

FIGS. 17 and 18 schematically show, according to two orthogonal views, a device used to complete coring and to axially cut the pear in two parts;

FIG. 19 is a schematical side view, according to the arrow direction F5 in FIG. 2, of the various mechanisms which motorise and connect to one another the different devices of the machine;

FIG. 20 is a side view (on the opposite side with respect to FIG. 19), in the direction denoted by the arrow F6 in FIG. 1;

FIG. 21 illustrates a plurality of circular rings (34), forming together a "sleeve", and into which it is possible to introduce a relating body or "rotor" (55) (see FIG. 23—drawing sheet No. 15), in such a way as to realise a pneumatic rotary joint;

FIGS. 22 and 23 are two orthogonal views of the "rotor" of the rotary joint;

FIGS. 24 and 25 are two orthogonal views (views in mutually orthogonal directions), of the tool for removing the core (seed celler) and for cutting the pear, provided with "microholes", FIG. 26 is a detailed view, showing how to mount toothed wheels and/or cams or pulleys, in order to allow small corrections in the mutual phase of the mechanisms making up the machine.

BEST MODES OF CARRYING OUT THE INVENTION

In the figures, some parts of the machine have been omitted for clarity; moreover, in order to provide a clear and concise description, the annexed drawings do not include common structural elements, and mechanisms which are either already known or intuitive to a skilled person.

In the various figures, the same alphanumeric references are employed for the same parts or elements.

Figure 3:
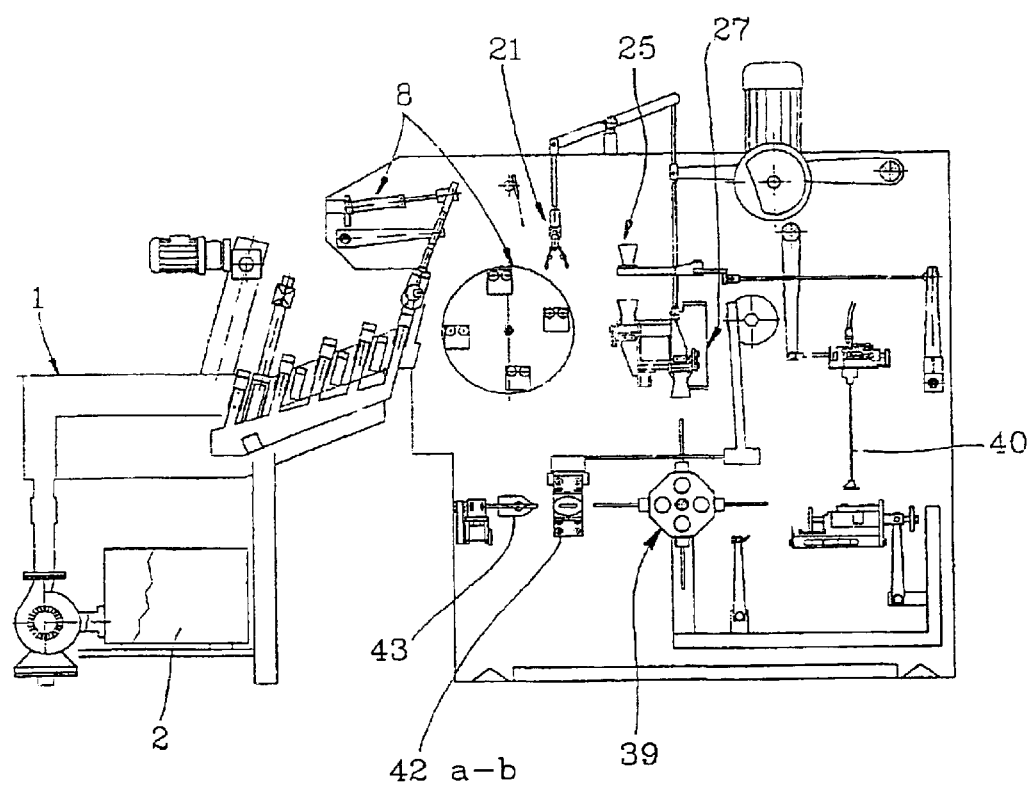
FIG. 3 schematically shows the arrangement in space, of the main devices of the machine.

Referring to the figures, reference number 1 generally denotes the pear washing and feeding device (FIGS. 3 and 4). The latter is characterised by a basin 2, containing water and additives for preserving the pears, by a system 3 for recirculating and filtrating the water, by a feeder 4 with steps 5 to which a reciprocating motion is imparted, known per se, or by an equivalent known feeder whose function is to provide at its upper end a single horizontally arranged pear 7 (FIG. 4—arrow F1), whose stem 12 could point to the right or left of an observer. The only difference between the present device and already known devices, is that the upper end 6 of each step 5 which supports a pear, is shaped like a "cradle", on which said pear can rest (see FIG. 5).

Reference number 8 (FIG. 6) generally indicates a device which:

grasps a pear 7 by means of pneumatically actuated pliers 9, whose seizing force is adjustable; and which by means of mechanisms 10, realised in any known form, transfers the pear 7 to the position 11, onto rollers 13, having horizontal parallel—and possibly motorised—axes, which are appropriately shaped, e.g. cradle shaped or double-truncated-cone shaped, so as to maintain the pear 7 in the horizontal position. The said rollers 13 are supported, at least two by two, with horizontal and mutually parallel axes, by a plate 16 hinged to a turntable 17, in such a way that, by employing any known means, said plates maintain their orientation while the turntable 17 rotates around a horizontal axis 18. Naturally, also the plates 16—whose number is at least equal to 4—, will rotate around a pin 19.

The turntable 17 rotates intermittently and includes four stations. The device 8 comprises also:

a rod 14, bearing a plurality of sensors and/or detectors (not shown); said rod can let its sensors interfere with the pear in the position indicated by 7/b, when actuated by means of known mechanisms 15, so as to determine:

a) the pear orientation: stem pointing to the right or to the left, or in a different direction (in the latter case the pear is discarded);
b) whether the pear is oversized or undersized; if so, the pear must be discarded;
c) whether the aspect ratio—length/diameter—of the pear, is comprised between predefined minimum and maximum values (in other words, if its shape is like that of a pear or that of an apple: in the latter case, it is impossible to ensure the correct orientation in the next steps, so that in this case too it is necessary to remove the pear from the processing cycle); and to send a coded signal to the following device (see FIG. 7), "informing" it whether the pear must be seized or not in the position 7/c.

If the pear 7 has a completely regular shape, it will be seized and displaced to the next device in order to start the required processing steps, if it is not regular in shape, it will be displaced to the position 7/d, in which, interfering with the rod 20, it is discharged from the rollers 13 and falls onto a belt conveyor (not shown), the latter transporting the pear towards a collection place.

The turntable 17 rotates in the direction of the arrow F7 whereas the rod 20 remains stationary.

Reference number 21 (FIG. 7) generally indicates a device which:

by means of pneumatically actuated pliers 99 whose seizing (closure) force is adjustable, seizes the pear 7 at position 7/c in FIG. 6;

rotates by 90° in the direction indicated by the arrow FS, and simultaneously by 90° around its own axis 23 in the clockwise or anticlockwise direction, depending on the signal received from the sensors disposed on rod 14 (see FIG. 6), that is depending on whether the stem 12 is directed to the right or left; in this manner the pear 7 is always disposed with its axis arranged vertically and with its stem pointing downwards. When reaching this position, the pear 7 will be positioned on a funnel-shaped support 24 belonging to the next device, shown in FIG. 10; the pliers 22 will open, so as to drop the pear inside the funnel 24.

A device of the same kind as the device 21, is disclosed in the mentioned patent application PCT/IT98/00286, so that it is deemed unnecessary to specify farther details thereof.

Reference number 25 (FIG. 10) generally indicates a device having the function to displace the pear 7 to a further funnel-shaped support 26, belonging to the device shown in FIG. 12, and to locate the pear inside this support.

Reference number 27 (FIG. 12) generally denotes a device which is characterised in that:

it comprises two funnels 26, mounted on opposite sides of a tubular beam 58, one of them being arranged upside-down with respect to the other, and said beam being rectangular in cross-section in the illustrated example. The beam 58, having a horizontal axis, is apt to rotate intermittently around its own axis 29 by 180° each time, so that, after each rotation by 180° (arrow F2) it receives a pear from the device 25 and turns the pear upside-down, in such a way that the latter will have a vertical axis and a stem directed upwards;

the whole assembly is supported by a cross member 30, which is vertically slidable along guide columns 31;

the funnels 26 are surmounted by pneumatically actuated pliers 32, which perform the automatic centering of the pear with respect to the funnel axis, while preventing its accidental exit (disengagement); of course, said pliers may be realised and actuated in ant known manner;

the vertical sliding movement of the cross member 30, allows to thrust a rear with its stem directed upwards, on a tubular tool 33 with chamfered end, embodying a first coring tool; a "carrot" including the flower and stem of the pear is formed inside this tool. Said tubular tool, belongs to the device of FIG. 13. The downward movement of the cross member 30 stops when the pear 7 is detected by a proximity sensor or other kind of detector (not shown), which allows to position the pears at a constant height (or, in other words, always at the same location), thereby preventing them from interfering with (abutting on) a fixed stopper; the latter would bruise ripe pears, with the risk of being forced to discard them, because as a result, the successive external peeling could be irregular, as no precise reference point (position) is available.

When working simultaneously on four different rows, as in the illustrated embodiment we are describing (FIGS. 1 and 2), the funnel-shaped supports 26 and the associated pliers 32 are eight in number. In order to be able to realise a pneumatic circuit of simple construction allowing to close and open the pliers 32, a rotary distributor is provided, like that shown in FIGS. 21 and 22. In FIG. 21 there is shown a plurality of rings 34 which form the fixed external part (or sleeve), to be fed by the power valves (not shown) which directly actuate the pneumatic cylinders (not shown) mounted on the pliers. FIG. 22 shows the rotating part 35, which is introduced inside the rings 34, and this rotating part 35 is integral with the tubular part 58, shown in FIG. 12, inside which there are mounted several tubes 61, necessary to actuate the cylinders which control the pliers 39.

Said rotary air distributor is characterised in that:

it comprises a circular head 55 (FIG. 29) including the required number of axial blind holes 56 (corresponding to the number of tubes 61, and to the number of pliers 39, respectively);

said bead 55 is connected at one end, by a sleeve 68 and flanges 57, to the rectangular tube 58, and the latter has the appropriate length;

at the opposite end, the rectangular tube 58 is connected to a head having the function of a support and of allowing the rotation of the assembly (see FIG. 12);

on at least one of the side walls of the rectangular tube, in appropriate locations, there are realised holes 60 permitting to connect (by employing tubes and connectors, 61 used in pneumatic circuits and introduced inside the rectangular tube itself) the said holes with the axial holes 56 provided on the head 55;

the axial holes 56, are in turn in communication with radial holes 62 realised in appropriate positions;

in each operative position, the tubes 61 can feed compressed air to the pneumatic cylinders controlling the centering pliers 32;

the male head 55 is introduced inside the ring assembly 34 (FIG. 21), inside which it can rotate, assuming consecutively two positions at an angle of 180° to each other;

each ring 34 of the assembly is connected to a respective solenoid valve by means of tubes and connectors, and has holes which are in communication, in the operative positions, with the radial holes 62 provided on the head 55.

The whole assembly is realised in such a way as to allow to actuate the pliers 32 according to a program.

When the tubular tool 33 pierces the body of the pear concentrically to its longitudinal axis, the blossom and the whole ligneous part connecting the blossom to the stem is removed.

Reference number 39 (FIG. 13) generally indicates a rotary head, having a horizontal axis, and including four stations (A) (B) (C) (D).

In station A the device of FIG. 12 thrusts the pear on the tubular tool 3.

The tubular tool 33 is set in rotation in station B, thereby rotating the pear at the same time; in this step, the following operations are performed on the pear, using already known means:

a) external peeling of the pear, by means of the already known device shown, in FIG. 14;

b) cleaning of the blossom end and removal of the end near the stem, by means of the device in FIGS. 15 and 16, which is also already known.

The only improvement to known applications is thaw a movement following a contour similar to the external contour of a pear, is imparted to the arm 40 (arriving the small mill 41, by using a cam or similar device which performs the same function. In conventional systems, the mill support head is in contact —by means of a small wheel—with the surface of the pear, while the mill 41 projects beyond this small wheel by an amount sufficient to remove the thickness of the skin. Therefore, the small wheel "follows" during its movement the silhouette or external contour of the pear, since the rod 40 is not rigid but is elastically urged against the outside surface of the pear. Thus, the predefined or pre-set movement according to the present invention, which follows the profile of the pear, corresponds to dimensions which are less than the real size of a pear; the reason of providing such predefined movement, is to limit the differences in the load values, by which the small wheel (feeler wheel or tracer) acts on the pear, during its movement from the "stem region" to the "belly region" of the pear. If this difference in pressure is noticeable, waste is produced during processing of ripe pears. In station (C), the pear—whose skin has been completely removed—is still held on the tubular tool 33, and a portion of the core, herein called "carrot", lying between the blossom and stem, is contained inside the tubular tool.

The tubular tool 33 contains a piston which may slide axially, according to a limited amplitude. This amplitude is chosen so that the "carrot" being formed inside the tubular tool, in station (A), may actually be completely received inside the tubular tool, and that a complete expulsion in station (C) is ensured at the same time.

These operations are performed by feeding compressed air towards the piston, in order to push the carrot to the outside, and, once this compressed air has been discharged, by realising a communication between the inside of the tubular tool 33 and a suction pump, so as to retract the piston and maintain it in the latter position.

In station (D), a self-centering vice 42/a–b, already known from the PCT patent application cited in the introductory part of this specification, slips off the pear from the tubular tool 33 of the rotary head, and translates it towards and on the device 43 used to cut the pear into segments and to remove the central core, which device is also disclosed in the application PCT/IT98/00286; the latter is considered incorporated by reference in the present application, for what concerns all constructive details corresponding to the known art.

According to an important improvement (see FIGS. 24 and 25), longitudinal blind holes 46, having a very small diameter, are realised on both blades 44, 45 which longitudinally cut the pear in two segments while it is still contained in the vice 42/a–b, said holes of very small diameter are realised on approximately the whole length of the respective blade, and transversal holes 53 are realised in correspondence with the longitudinal holes, so as to establish a communication between said longitudinal holes and the outside; a jet of compressed air (air "pulse") is discharged at an appropriate instant of time, through said holes, so as to ensure detachment of the two core pieces from the two halves of the pear, and separation of the two halves of the pear from each other and from the blades 44, 45.

A belt conveyor, of a grid kind, having slits suited to drop the cores and retain the two halves of the pear, translates the latter where they are required, while the cores are collected by a second belt conveyor and transferred to another place.

Location and construction of said belt conveyors, are neither shown nor disclosed, since the belt conveyors may be realised in any known configuration.

In order to allow small phase compensations between various known mechanisms, used to realise the movements of the various devices which have already been shown and described, it is possible to resort (see FIG. 26) to the following means: a flanged bush 47 is fitted to a generic motorised shaft 48, and the toothed wheel 49 is introduced on the sleeve 50 of the bush 47; then, the toothed wheel 49 is connected to the flanged bush 47 by means of screws 51 and slots 52 provided on the wheel 49 in positions aligned with the screws 51; however, it is also possible to resort to any other known means. The operation of the machine of the present invention is as follows.

the pears are initially contained inside the basin 2;
using a suitable loader (see FIG. 4) they are lifted one by one and positioned in a well defined location, in a horizontal arrangement; their stem may point to the right or left with respect to an observer;

pliers 9 (FIG. 6) seize the pears and transfer them on a respective one of four supports 16 of a turntable 17, the latter having a horizontal axis 18 and four stations;

the turntable rotates by 90° and the pear 7 is subjected, in this second station, to the action of a feeler rod 14 which "reads out" the pear, this feeler rod being provided with a plurality of sensors and/or detectors, which—according to the location, orientation, dimension, and shape of the pear—define a "code", which in turn allows or prevents the pear from being seized in the successive station (third station);

in the third station, pears not suited for processing, will not be picked up, and in this case the pear will be discarded in the fourth station and will be discharged onto a belt conveyor which carries it to a place where it can be processed in a different way (with different devices);

a pear suited for processing is picked up in the third station by means of pliers 2 (FIGS. 6 and 7), and is rotated by 90° around two mutually orthogonal axes, so that its axis is always directed vertically and its stem points downwards (as disclosed in PCT/IT98/00286);

from this position, the pear is dropped in a funnel-shaped support 24 (FIGS. 8, 9, 10) and displaced to a farther funnel-shaped support 26 provided with self-centering pliers 31;

the pear is dropped in the funnel 26, where it is centred and aligned with respect to the funnel axis, and retained by the pliers 32;

the device comprising the funnel which holds the pear, is rotated by 180° (FIG. 12), after which the pear has its axis directed vertically and its stem pointing upwards;

the device which retains the pear is moved downwards (FIG. 12) and thrusts the pear onto a tubular tool 33, and the latter separates a "carrot" which includes the blossom and the stem;

the tubular tool 33 is part of a rotary head 39 (FIG. 13) with four processing stations see PCT/IT98/00286) wherein the tubular tool 33 itself constitutes the first station where separation of the "carrot" occurs;

the pear is released by the pliers 32 and remains on the tubular tool 33, in a well defined position, and the tubular tool contains the "carrot";

the rotary head rotates by 90°, and in station B the tubular tool 33 is set in rotation together with the pear, and the pear is peeled while being cleaned in the blossom region and cut in the stem region;

the pear is further rotated by 90° (station C), and the carrot is expelled from the tubular tool 33;

the pear is further rotated by 90° (station D), it is seized by a special vice FIGS. 17, 18), it is slipped off from the tubular tool 33 and thrust on the special tool 43, which cuts the pear in two halves and separates the central core (seed celling operation);

according to another aspect of the present invention, simultaneously with the opening of the vice, compressed air is injected inside holes of very small diameter, realised in the blades 44 and 45 used to cut the pear in two parts, and this causes detachment of the two halves of the pear from each other and from the core;

the two halves of the pear are recovered by a belt conveyor, and the core is recovered by a second belt conveyor;

the cycle may be repeated automatically on only one row (path) or on a plurality of parallel rows (paths).

The invention is susceptible of various modifications and variants, all belonging to the same inventive concept, and moreover all constructive details thereof may be replaced with equivalent means.

What is claimed is:

1. A machine for automatically coring, peeling, and cutting a pear into two or more segments, comprising:

a pear feeder (1), which singularizes the pears (7) and arranges each pear (7) horizontally in a precise reference position;

a knockout device, in a four station rotary head (39), for expelling the carrot which comprises the blossom and stem (12) of the pear (7), said knockout device being actuated by compressed air during expulsion and by a negative pressure means during its return to the initial position;

a device (44, 45) for coring the pear and cutting it into segments, including two blades (44, 45);

characterized in that:

it further comprises a device (14, 15) suited to read out the orientation and deformity of the pear, in order to stop it or to allow continuation of its processing;

a device (16, 17, 20) which discharges pears not suited for processing, onto a belt conveyor or inside a hopper, in order to recover them;

a rotary pneumatic distributor (34, 55, 58), suited to feed air towards pliers actuation cylinders, acting on pear self-centering pliers (32);

a device for performing accurate positioning of the pears (7) before their peeling;

a cam, which imparts to the peeling mill (41) a path similar to the profile of a pear (7); and in that said device for coring the pear (7) and cutting it into segments, is provided with holes (46, 53) of very small diameter, allowing to safely separate the core from the edible parts after cutting.

2. A machine according to claim 1, characterised in that said device suited to read out the orientation and deformity of the pear, comprises:

a rod (14), supporting a plurality of sensors and/or detectors;

a mechanism (15), which displaces said rod (14) from a rest position to a position where said sensors and/or detectors can interfere with a horizontally arranged pear, which is located in a predetermined welt-defined position (7/b);

wherein the combination of signals sent by the sensors and/or detectors are converted into a enabling signal, provided the pear has the requisites for being processed, or into an inhibit signal, if the pear cannot be processed by the machine.

3. A machine according to claim 1, wherein said device which discharges the pears not suited for processing onto a belt conveyor or into a hopper, in order to allow their recovery, comprises a turntable (17) having a horizontal axis and at least four stations, and furthermore:

a mechanism, imparting to the turntable an intermittent rotary motion, synchronised with the other devices which form the machine;

four supports (16), each of them being associated to a respective station and being apt to support individually a horizontally arranged pear while maintaining the same orientation;

at least one rod (20), which is fixed and positioned in such a way as to interfere with the pear when the latter is present in the fourth station, thereby discharging the pear on said belt conveyor or into said hopper.

4. A machine according to claim 3, wherein each of said supports comprises at least a pair of rollers (13) with parallel and horizontal axes, said rollers being appropriately shaped and located at an appropriate reciprocal distance in order to be able to contain the pear and hold it in a laid down, that is horizontal, position.

5. A machine according to claim 3, wherein each support (16) which carries a pair of rollers (13) is integral with or supported by a shaft (19), and is connected in a kinematical manner, according to any known configuration, so as to maintain a constant orientation during rotation of the turntable (17).

6. A method for processing pears, using a machine according to claim 1, wherein:

a) in the first station (7/a) of the turntable (17), a pear is deposited on the rollers (13), in a laid down, that is, horizontal arrangement;

b) in the second station (7/b), said device suited to read out the orientation and deformity of the pear, performs its reading operation;

c) in the third station (7/c), provided the reading of the pear has lead to a positive result, the pear is picked up and can be transferred to the following processing steps; otherwise, the pear is not picked up;

d) in the fourth station (7/d), nothing happens if the pear is not there; in contrast, if the pear is present in this station, it interferes with said fixed rod (20) and is thereby discharged onto a belt conveyor and is recovered elsewhere.

7. A machine according to claim 1, wherein said device for coring and cutting the pear into segments, which is provided with holes of very small diameter, is realised in such a way that in each of the two blades (44, 45) which longitudinally cut the pear in two halves, there are provided:

at least one longitudinal blind hole (46), extending almost along the whole length of each blade;

transversal holes (53), located in correspondence with said longitudinal holes, so as to realise a communication between the longitudinal blind holes and the outside, in order to create an air cushion between the wails of the cutting blades (44, 45) and the inner surfaces of the pear segments, when compressed air is injected through the holes (46, 53).

8. A machine according to claim 7, wherein also water provided with additives, or other kinds of products, are injectable instead of compressed air, inside said holes (46, 53) of very small diameter.

9. A machine according to claim 1, wherein said device for performing accurate positioning of the pears before peeling, stops the movement of a cross member (30) supporting a funnel (26) provided with self-centering pliers (32), during the step in which the pear is thrust on a tubular tool (33) used to remove the carrot.

10. A machine according to claim 9, wherein in an embodiment, a brake or other suitable device performing the same function, is controlled by means of a signal sent by a sensor or other known means, said sensor detecting the arrival and the presence of the pear (7).

11. A machine according to claim 1, wherein said rotary pneumatic distributor (34,55,58) is used to feed compressed air to pneumatic cylinders which actuate the self-centering pliers (32) arranged on the funnels (26) which contain the pears, this operation being performed according to a program.

12. A machine according to claim 11, wherein said rotary pneumatic distributor comprises:

a circular head (55), made integral at one of its ends, by employing any kind of known means, so a tube (58) of preferably rectangular or square cross-section;

a flange with a pin, integrally formed at the other end of said tube (58);

a plurality of circular rings (34) arranged adjacent to each other in order to form a sleeve, inside which said circular head (55) is introduced so as to freely rotate therein.

13. A machine according to claim 11, wherein:

a plurality of axial blind holes (56) are realized in said circular head (55), which are suited to receive connectors or tubes (61), and radial holes (62) being further provided, in communication with said axial holes (56);

radial holes are provided in said adjacent circular rings (34), suited to insert therein respective external connectors (I, II, III, IV, V, VI, VII, VIII);

the radial holes realized on the head (55) and on the circular rings (34), are sized and located in a way to realize an alignment between them, taking into account the functions they have to accomplish, and considering that the head (55) may assume two positions at angles of 180°;

in appropriate positions inside the tube (58) having a rectangular cross-section, on at least one wall of said tube, there are provided holes (60) suited for the insertion of connectors.

14. A machine according to claim 11, wherein a pneumatic circuit, controlling said pneumatic cylinders which actuate the self-centering pliers (32), is realized:

by connecting a respective solenoid valve to each circular ring (34);

by realizing a communication between the axial holes of said circular head (55), and the holes (60) realized on the side walls of said tube (58) having a rectangular cross section, making use of tubes (61) for pneumatic circuits which are contained inside the rectangular tube (58), by connecting the external connectors provided on the side walls of the rectangular tube, to said pneumatic cylinders.

15. A machine according to claim 1, wherein said cant which imparts to the peeling mill (41) a movement similar to the profile of a pear, is equipped with an actuating mechanism which may be realised in any form, such that, independently of the actual presence of a pear in the peeling station (B), the mill supporting rod (40) and its mechanism, are forced to follow a path which reproduces the profile of a pear, so as to reduce the difference between the maximum and minimum pressure by which a tracer wheel effectively acts on a pear; in this way, the mill (41) is constrained to follow the actual profile of each pear to be peeled, and cannot assume values which would cause its partial penetration into the pear, when the latter has a certain degree of ripeness or has not a sufficient and/or uniform hardness.

16. A machine according claim 1, wherein in order to effect small compensations of the synchronization between various mechanisms, which are realized according to known configurations, and which control the movements of the various devices of the machine, toothed wheels, or cams are inserted on sleeves (50) provided with a flange (47), and are screwed on the flange (47) by introducing screws through slots (52) realized on the toothed wheel or cam; said sleeves (50) being fixed in turn, in any known manner, to respective shafts (48).

* * * * *